COMPOSITE TELEVISION VIDEO SWITCHING CIRCUIT
Filed March 30, 1967
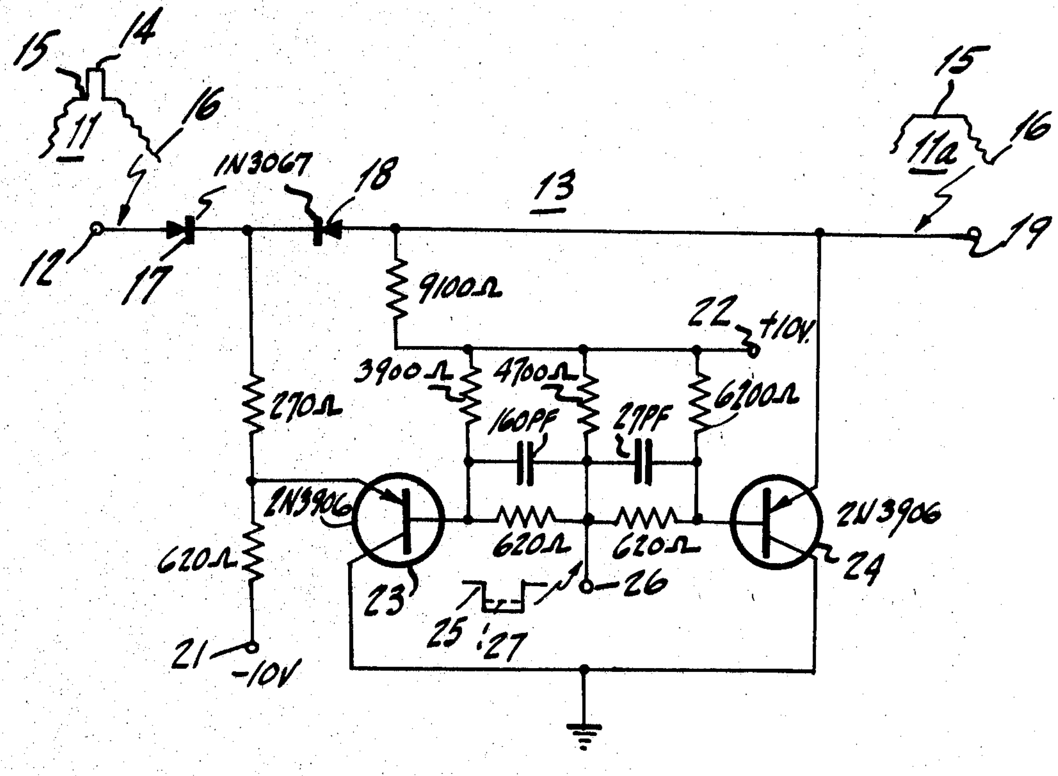
INVENTOR
LEONARD J. BAUN
BY
ATTORNEY United States Patent Office 3,527,886
Patented Sept. 8, 1970

3,527,886

COMPOSITE TELEVISION VIDEO SWITCHING CIRCUIT

Leonard J. Baun, Cinnaminson, N.J., assignor to RCA Corporation, a corporation of Delaware Filed Mar. 30, 1967, Ser. No. 627,193
Int. Cl. H04n 5/22
U.S. Cl. 178—7.1 9 Claims

ABSTRACT OF THE DISCLOSURE

A circuit for transferring the video component to the exclusion of the synchronizing pulses of a composite television signal includes diode means having normal biasing to provide the circuit with a relatively low impedance during video signal intervals, the biasing being periodically changed to provide the circuit with a relatively high impedance during blanking intervals.

In the processing of composite television signals, it frequently is necessary to regenerate the synchronizing pulses which may have been mutilated or distorted in transmission from one point to another as, for example, in network and the like operations. For such purpose a stabilizing amplifier is provided which, as one of its functions, blanks the signal and thereby removes the synchronizing pulses from the received composite television signal so that they may be replaced with locally generated undistorted synchronizing pulses for re-transmission of the signal. In order to achieve a satisfactory result it is necessary that the pulse removal apparatus function in such a manner that it be prevented from introducing into the reconstituted composite television signal any spurious effects such as switching transients, for example.

It, therefore, is an object of the invention to provide apparatus for blanking a composite television signal during blanking pulse intervals without introducing switching transients or other spurious effects into the resultant video signal.

In accordance with an illustrative embodiment of the invention, a received composite television signal is impressed upon a signal transfer circuit which includes unidirectional current conducting means normally biased during video signal intervals to impart a relatively low impedance to the signal transfer circuit. The biasing of the unidirectional current conducting means is altered during blanking pulse intervals to impart a relatively high impedance to the signal transfer circuit and, at the same time, to effectively short-circuit the output of the transfer circuit which thereby inhibits the transfer of synchronizing pulses and other unwanted signal effects. The bias alteration and output short-circuiting is accomplished in a way to effectively prevent the introduction of transients into the resultant video signal.

For a more detailed disclosure of the invention, reference may be had to the following description which is given in conjunction with the accompanying drawing, of which:

The single figure of the drawing is a schematic circuit diagram of apparatus embodying the invention for removing the synchronizing pulses from a composite television signal.

In the drawing a received composite television signal 11 derived from a low impedance source (not shown) is impressed upon the input terminal 12 of a signal transfer circuit 13 in such a manner that the synchronizing pulse 14 is positive-going from the black-representative video signal level 15 and the white-representative video signal 16 is negative-going from the black signal level 15. The signal transfer circuit 13 comprises series-connected unidirectional current conducting means such as oppositely poled diodes 17 and 18 and terminates at an output terminal 19. The diodes 17 and 18 are biased normally for conduction during the video signal intervals by means including the connection of their respective cathodes to the negative potential at terminal 21 and the connection of the anode of diode 18 to the positive potential at terminal 22. It will be understood that the potential at terminal 21 is sufficiently more negative than the white-representative video signal 16 to maintain the diode 17 in a conductive state during video signal intervals. Also, the potential at terminal 22 is sufficiently more positive than the black-representative video signal 15 to maintain the diode 18 in a conductive state during video signal intervals. Thus, considering only those elements of the signal transfer circuit 13 described up to this point, it may be seen that, during video signal intervals, a television signal 11*a* is transferred to the output terminal 19. The signal 11*a* has been blanked and includes only a video signal which is identical to that of the input television signal 11.

The switching means for altering the biasing of the diodes 17 and 18 includes normally non-conducting transistors 23 and 24 both of which have their collector electrodes grounded. The emitter electrodes of the transistors 23 and 24 are connected respectively to the cathodes of the diodes 17 and 18 and to the anode of diode 18. The transistors 23 and 24 are switched into current saturation during the blanking pulse interval by a negative-going switch pulse 25 impressed upon a terminal 26. The pulse 25 is applied concurrently to the base electrodes of the transistors 23 and 24, the latter of which is slightly faster operating than the former by virtue of its faster time constant base electrode circuit.

With the switching transistors 23 and 24 in their conducting states the respective emitter electrodes and the circuits connected to them are effectively connected to ground. The diode 18 is rendered non-conducting by the impression of ground potential upon both cathode and anode thereof through the grounded emitter electrodes of the transistors 23 and 24. The diode 17 also is rendered non-conducting to the synchronizing pulse 14 of the composite input signal 11 although the pulse 14 would not be transferred to the output terminal 19 because of the non-conducting state of the diode 18 even if the diode 17 were in a conducting state. In this way the signal 11*a* at the output terminal is effectively blanketed at the black-representative signal level 15, thereby removing the synchronizing pulse.

From the foregoing description it may be seen that, with the switching transistors 23 and 24 non-conducting, the impedance of the signal source and transfer circuit is relatively low. The impedance of the transfer diodes 17 and 18 is relatively high when these transistors are conducting while the impedance of transistor 24 is very low, thereby effectively short-circuiting the transfer circuit 13 at its output terminal 19. In effecting the switching operation, such as that described, there usually is a tendency to produce transients in the resultant signal caused by the differentiation of the leading and trailing edges of the switch pulse 25. In the present case, the differentiating circuit comprises chiefly the resistive impedance of the signal transfer circuit 13 and the inherent circuit capacitance effective between the base and emitter electrodes of the transistor 24. With a given value of circuit capacitance, the higher the impedance of the circuit 13 is the greater will be the peak amplitudes of the transients. Yet it is necessary that, during the blanking pulse interval, the impedance looking back into diodes 17 and 18 of the circuit 13 must be high in order to remove the synchronizing pulse and other unwanted signal effects from the television signal. Hence, the apparatus must be arranged so that the circuit impedance is low during video signal intervals and at the instants of switching and is high during the blanking pulse intervals.

The desired result is accomplished by the apparatus of the drawing figure in the following manner. The transistors 23 and 24 are biased so that they are not rendered sufficiently conductive to cut off the diode 18, and prevent negative-going video signals from passing through diode 17 until the switch pulse 25 has reached a voltage level 27 closely approaching the voltage level of the maximum pulse excursion. Until the level 27 is reached the impedance of the circuit 13 remains low and substantially no differentiation of the pulse 25 occurs. Only during the relatively small remaining part of the switch pulse excursion is the impedance of the circuit 13 high and any differentiation of the leading edge of the pulse 25 is insignificant. The reverse of this described operation takes place in response to the trailing edge of the switch pulse 25. As soon as the pulse reaches the voltage level 27, the impedance of the signal transfer circuit 13 reverts to its low value by reason of the decreased current conduction in the transistor 24 with the resultant removal of the cut off bias from the diode 18 and the resumption of forward conduction of the diode 17. The circuit also has the characteristic of maintaining a low impedance looking back from output terminal 19 at all times.

What is claimed is:

1. Apparatus for removing the synchronizing pulse from a composite television signal without introducing switching transients into the resultant video signal, comprising:

a signal transfer circuit having input and output terminals and including unidirectional current conducting means;

means for forwardly biasing said unidirectional current conducting means so as to impart a relatively low impedance to said signal transfer circuit during video signal intervals; and switching means responsive to a switch pulse for altering the biasing of said unidirectional current conducting means so as to impart a relatively high impedance to said signal transfer circuit during blanking pulse interval only in response to substantially the maximum amplitude of said switch pulse.

2. Apparatus for removing the synchronizing pulses from a composite television signal as defined in claim 1, wherein:

said unidirectional current conducting means includes two oppositely poled diodes each having a cathode and an anode electrode serially connected in said signal transfer circuit and normally conducting during video signal intervals; and said switching means includes at least one transistor coupled to one electrode of one of said diodes and operable during blanking pulse intervals to render said one diode nonconducting

3. Apparatus for removing the synchronizing pulses from a composite television signal as defined in claim 2, wherein: said switching means includes a control circuit for said one transistor to receive switch pulses during said blanking pulse periods by which to render said one transistor sufficiently conducting to render said one diode non-conducting.

4. Apparatus for removing the synchronizing pulses from a composite television signal without introducing switching transients into the resultant video signal, comprising:

a signal transfer circuit having input and output terminals and including two oppositely poled diodes each having a cathode and an anode electrode serially connected in said signal transfer circuit and normally conducting during video signal intervals;

means for forwardly biasing said diodes so as to impart a relatively low impedance to said signal transfer circuit during video signal intervals;

switching means including at least one transistor responsive to switch pulses during blanking pulse intervals coupled to one electrode of one of said diodes for imparting a relatively high impedance to said signal transfer circuit during blanking pulse intervals, said one diode being biased such that appreciable current conduction by said one transistor is required to render said one diode non-conducting; and said switching means includes a biasing circuit for said one transistor of such a character that said appreciable current conduction by said one transistor is effected only in response to substantially the maximum amplitude of said switch pulse.

5. Apparatus for removing the synchronizing pulses from a composite television signal as defined in claim 4, wherein:

said switching means includes a second transistor having a control circuit and coupled to a second electrode of said one diode; and means for applying said switch pulses to the control circuit of said second transistor to render it conducting in a manner to aid said first transistor in rendering said one diode non-conducting.

6. Apparatus for removing the synchronizing pulses from a composite television signal as defined in claim 5, wherein: said second transistor is coupled to an electrode of the second one of said diodes corresponding to said second electrode of said one diode to bias said second diode toward a non-conducting state.

7. Apparatus for removing the synchronizing pulses from a composite television signal as defined in claim 6, wherein:

said second electrode of said one diode and said corresponding electrode of said second diode are cathodes of said respective diodes;

said first electrode of said first diode is an anode and is coupled to the output terminal of said signal transfer circuit; and the second electrode of said second diode is an anode and is coupled to the input terminal of said signal transfer circuit.

8. Apparatus for removing the synchronizing pulse from a composite television signal as defined in claim 7, wherein:

said switching means includes respective grounded sources of positive and negative potentials connected respectively to the anode and cathode electrodes of said first diode and normally rendering said first diode conducting and imparting said relatively low impedance to said signal transfer circuit; and said transistors, when conducting, effectively connecting the anode and cathode electrodes of said first diode to ground and rendering said first diode non-conducting and imparting said relatively high impedance to said signal transfer circuit.

9. Apparatus for removing the synchronizing pulse from a composite television signal as defined in claim 8, wherein: said control circuit for said first transistor has a smaller time constant than that of said control circuit for said second transistor, whereby said first transistor is faster operating than said second transistor.

References Cited

UNITED STATES PATENTS

| | | | |
|---|---|---|---|
| 2,622,193 | 12/1952 | Clayden. | |
| 2,755,335 | 7/1956 | White | 178—7.1 |
| 2,959,690 | 11/1960 | Fluhr | 307—259 |
| 3,289,089 | 11/1966 | Linder | 328—69 |

ROBERT L. GRIFFIN, Primary Examiner

R. L. RICHARDSON, Assistant Examiner

U.S. Cl. X.R.

307—240, 259